(12) United States Patent
Etkin et al.

(10) Patent No.: US 9,461,872 B2
(45) Date of Patent: Oct. 4, 2016

(54) COMPRESSING DATA IN A WIRELESS NETWORK

(75) Inventors: Raul Hernan Etkin, San Francisco, CA (US); Erik Ordentlich, San Jose, CA (US); Gadiel Seroussi, Cupertino, CA (US); Marcelo Weinberger, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1326 days.

(21) Appl. No.: 12/792,535

(22) Filed: Jun. 2, 2010

(65) Prior Publication Data

US 2011/0298610 A1    Dec. 8, 2011

(51) Int. Cl.
*G08B 1/08* (2006.01)
*H04L 29/08* (2006.01)
*H04L 29/06* (2006.01)

(52) U.S. Cl.
CPC ......... *H04L 29/08792* (2013.01); *H04L 67/12* (2013.01); *H04L 69/04* (2013.01)

(58) Field of Classification Search
CPC ........ G08B 25/10; G08B 13/08; G08B 1/08; G08B 13/00; G06K 19/0723
USPC ................... 340/500, 501, 517, 539.1–539.3
See application file for complete search history.

(56) References Cited

U.S. PATENT DOCUMENTS

| 5,689,252 | A | * | 11/1997 | Ayanoglu et al. | 340/991 |
| 5,781,135 | A | * | 7/1998 | Kim et al. | 341/67 |
| 2003/0043852 | A1 | * | 3/2003 | Tadayon et al. | 370/477 |
| 2004/0131268 | A1 | * | 7/2004 | Sekiguchi | H04N 19/56 382/238 |
| 2006/0103534 | A1 | * | 5/2006 | Arms et al. | 340/572.1 |
| 2006/0167634 | A1 | | 7/2006 | Cho et al. | |
| 2007/0003146 | A1 | * | 1/2007 | Ko et al. | 382/224 |
| 2007/0030816 | A1 | * | 2/2007 | Kolavennu | 370/252 |
| 2007/0067742 | A1 | * | 3/2007 | Takaoka et al. | 715/850 |
| 2007/0079223 | A1 | | 4/2007 | Mondin et al. | |
| 2008/0231449 | A1 | * | 9/2008 | Moshfeghi | 340/572.1 |
| 2008/0284590 | A1 | * | 11/2008 | Kates | 340/539.22 |
| 2009/0322518 | A1 | * | 12/2009 | Liang et al. | 340/539.18 |

OTHER PUBLICATIONS

Lotfinezhad et al, Effect of Partially Correlated Data on Clustering in Wireless Sensor Networks, Oct. 4-7, 2004, IEEE, pp. 172-181.*
Tang, et al. An Energy Efficient Adaptive Distributed Source Coding Scheme in Wireless Sensor Networks. 0-7803-7802-4/03. 2003 IEEE.
Lotfinezhad, et al. Effect of Partially Correlated Data on Clustering in Wireless Sensor Networks. 0-7803-8796-1/04. 2004 IEEE.

* cited by examiner

*Primary Examiner* — Omer S Khan
(74) *Attorney, Agent, or Firm* — Fabian VanCott

(57) ABSTRACT

A distinguished node is dynamically selected from a subset of nodes in a wireless network. Data samples from the subset of nodes are received in view of the distinguished node status. At least one estimate is generated from the data samples and the data samples are compressed conditioned on the estimate.

9 Claims, 4 Drawing Sheets

COMPRESSING DATA IN A WIRELESS NETWORK

BACKGROUND

Data compression is the process of encoding information using fewer bits (or other information-bearing units) than an unencoded representation of the information would use, through the use of specific encoding schemes. Data compression can be burdensome in various power-constrained applications.

BRIEF DESCRIPTION OF DRAWINGS

The following description includes discussion of figures having illustrations given by way of example of implementations of embodiments of the invention.

DETAILED DESCRIPTION

As used herein, a sensor network refers to a network of nodes in which at least some of the nodes collect sensory data. In many situations, a plurality, majority or even all of the nodes in a sensor network collect sensory data. Sensory data may include external sensory data obtained by measuring/detecting natural sources such as temperature, sound, wind, seismic activity or the like. Sensory data may also include external sensory data obtained by measuring/detecting man-made sources such as light, sound, various frequency spectrum signals, etc. Sensory data may alternatively include data related to measuring/detecting sources internal to a sensor node (e.g., traffic flow on a network, etc.).

Frequently, in wireless sensor networks, the data collected by neighboring sensor nodes is statistically correlated. This correlation may be useful for reducing network bandwidth requirements via data compression. However, taking advantage of this correlation via compression often leads to complex algorithms that are not compatible with usage scenarios in which the nodes are power-constrained.

Wireless sensor networks represent a practical example of the tradeoff between data compression and power usage. Data compression reduces the amount of data to be transmitted between wireless nodes. Given that wireless transmission can be a power intensive operation, any reduction in the amount of data being transmitted can reduce the power needed to perform the transmission. However, in networks that use complex algorithms to leverage correlated data for better compression, the complex encoders that perform the data compression use more power, potentially offsetting the power saved by reducing the amount of data being transmitted. Accordingly, embodiments described herein exploit correlation in sensory data between neighboring nodes while conserving power in the encoding/compression process. As used herein, the term "correlation" refers to statistical dependencies between various samples of data.

Figure 1:
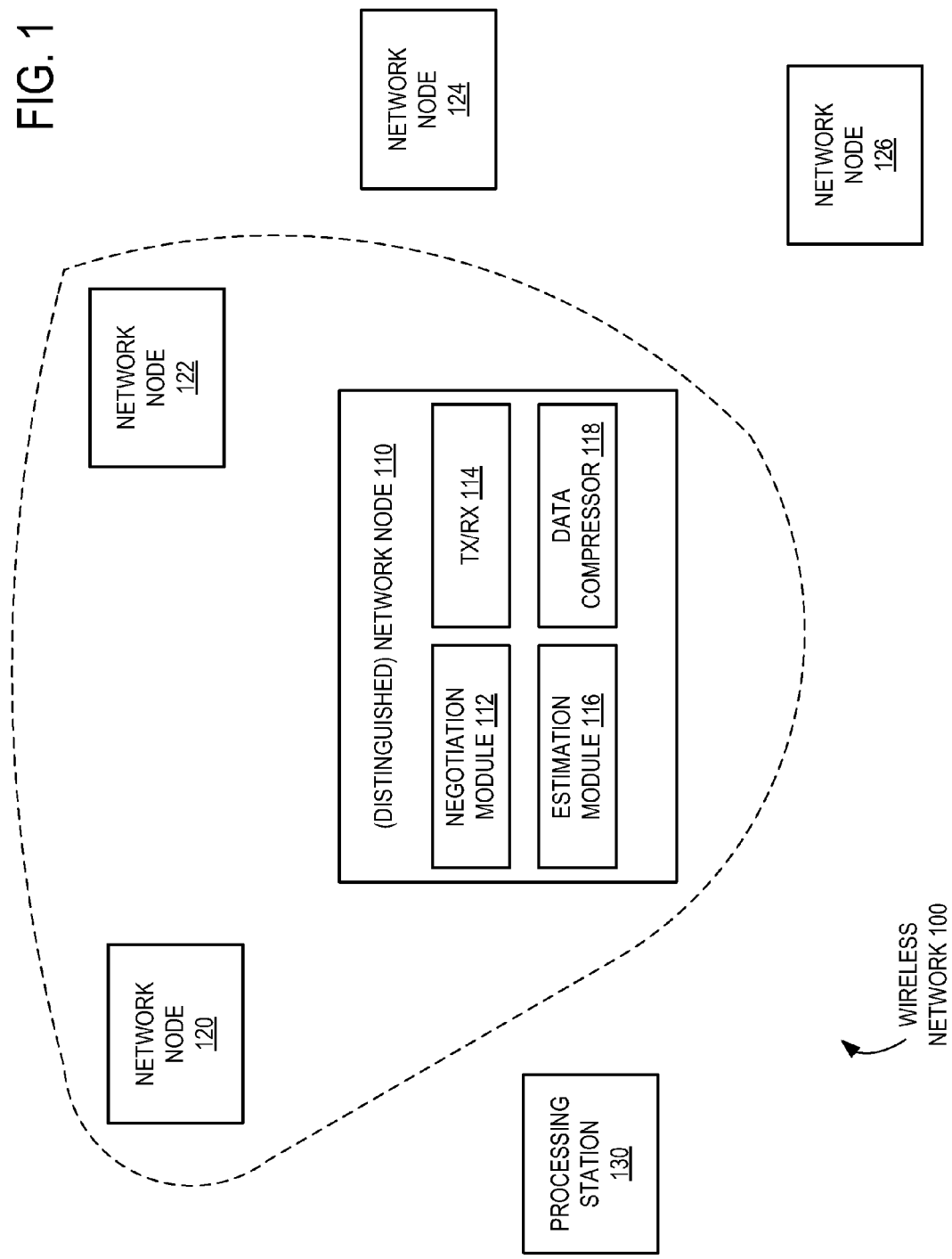
FIG. 1 is a block diagram illustrating a system according to various embodiments.

FIG. 1 is a block diagram illustrating a system according to various embodiments. As shown, wireless network 100 includes a plurality of wireless network nodes 110 and 120-126. Network nodes 120-126 may be the same or similar in form, function, size and features as network node 110, with the exception of node 110 representing a distinguished node. In other words, network node 110 is illustrated in more detail in FIG. 1 without necessarily having any different components or functionality than network nodes 120-126. Distinguished nodes will be discussed in more detail herein.

In general, network nodes in network 100 collect or otherwise obtain sensory data. Given the potentially limited processing capabilities and/or power available at each of the network nodes, embodiments described herein seek to aggregate sensory data and deliver it to a processing station 130 while minimizing power consumption. In various embodiments, sensory data collected at respective network nodes (e.g., nodes in a cluster) is sent to a distinguished node. The distinguished node exploits correlation in the sensory data received from respective network nodes and compresses the received sensory data. Compressed data is transmitted to processing station 130 where it may be decompressed, further processed, analyzed, further compressed, and/or stored.

Accordingly, negotiation module 112 negotiates (perhaps dynamically, based on changing conditions) a distinguished node status with at least a subset of other nodes 120-126. For example, the dotted outline illustrated in FIG. 1 might represent a subset or cluster of nodes in network 100 (nodes 110, 120 and 122). In various embodiments, each cluster or subset of nodes negotiates (via respective negotiation modules) a distinguished node status for the cluster or subset based on one or more factors. The distinguished node status may be negotiated dynamically, in various embodiments, based on changing external conditions, changing node conditions, and/or other suitable factors.

In one example, the distinguished node status is negotiated based on physical location of a node relative to other nodes (e.g., choose the node at the center of a cluster of nodes as the distinguished node). In another example, the distinguished node status is negotiated based on physical location of a node (e.g., a sensor node) relative to a source of sensory data (e.g., choose the node closest to the source as the distinguished node and have the distinguished node collect data from its neighbors—data from nodes further away might be discarded due to poor signal-to-noise ratio, or SNR). In yet another example, the distinguished node status could be negotiated based on SNR (e.g., choose the node with the lowest SNR as the distinguished node). As a result of its distinguished node status, this node could also avoid the collection of sensory data to save power.

Another factor that could affect negotiation of distinguished node status is the amount of power available at each node participating in the negotiation. For example, the node with the largest amount of power available could be negotiated as the distinguished node so that it can perform data compression (which can be a power-intensive operation).

Yet another factor that could affect negotiation of distinguished node status is a distance (e.g. Euclidean distance, wireless channel attenuation, number of hops, etc.) of a node to a processing station (e.g. processing station 130). The node with the smallest distance to a processing station or other destination could be selected as the distinguished node to minimize the transmission power used to send compressed data to the processing station.

Thus, in view of one or more of factors, negotiation module 112 negotiates with other nodes to determine a distinguished status (e.g., distinguished node or not distinguished node) for node 110. Assuming node 110 becomes the distinguished node, receiver 114 receives sensory data from other nodes in the network 100. In certain embodiments, receiver 114 may only receive sensory data from other nodes in the same cluster or from neighboring nodes.

Estimation module 116 generates at least one estimate from the sensory data. As discussed above, sensory data from neighboring nodes may be correlated. For example, if nodes 110 and 120-126 are all measuring temperature, it is foreseeable that temperature data from node 110 will be similar to temperature data collected at node 120, etc. To take advantage of this correlation, estimation module 116 generates at least one estimate of the data to be compressed, for example, by calculating the average of at least some of the received sensory data (e.g., average temperature). Conditioned on the estimate, data compressor 118 compresses sensory data received from all neighboring nodes (e.g., nodes in the cluster of the distinguished node). For example, the estimate might be used to differentially compress the sensory data, e.g., computing $D_i=X_i-Y_i$, where $X_i$ is a sample of the sensory data (e.g., at time index i) to compress, $Y_i$ is a sample of the estimate, and $D_i$ is differential data or prediction error data, which can then be compressed using an entropy code tailored to the statistical properties of the differential data as specified by a probability distribution $P(D_i)$. The code would assign shorter codewords to differential data values having higher probabilities as specified by $P(D_i)$. Typically if the absolute value of differential data value $D_i=d_1$ is smaller than the absolute value of differential data value $D_i=d_2$ then $P(d_1)>P(d_2)$. The estimate may also be compressed since it is required to reconstruct the sensory data from the differential data. The compressed sensory data is thus comprised of the compressed estimate and the compressed differential data. Transmitter 114 sends compressed sensory data corresponding to all sensory data received from neighboring nodes to processing station 130.

Figure 2:
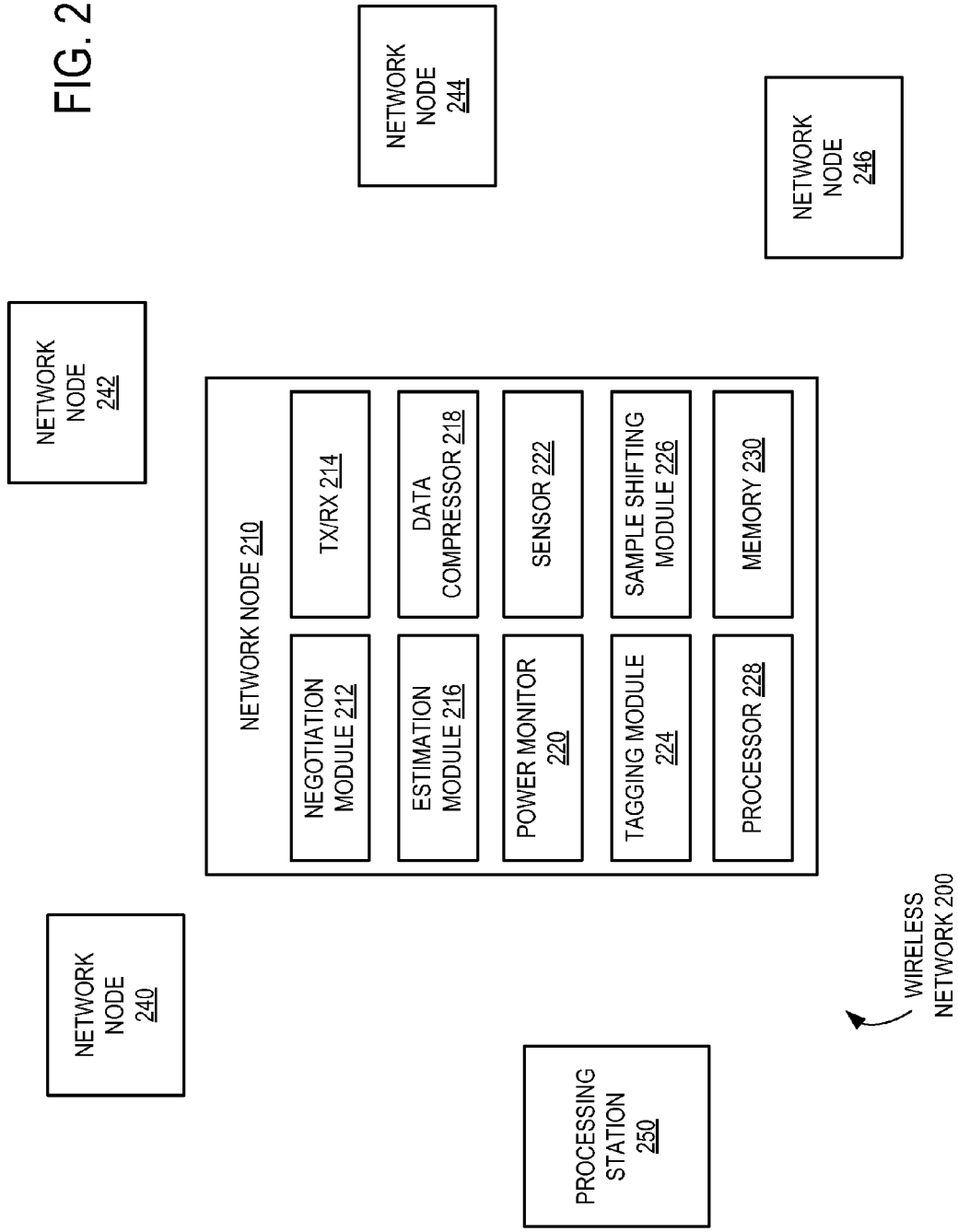
FIG. 2 is a block diagram illustrating a system according to various embodiments.

FIG. 2 is a block diagram illustrating a system according to various embodiments. Wireless network 200 includes wireless network nodes 210 and 240-246. In general, network nodes in network 200 collect or otherwise obtain data (e.g., sensory data). Given the finite processing capabilities and/or power available at wireless network nodes, sensory data is aggregated and delivered to processing station 250 while minimizing power consumption.

Negotiation module 212 dynamically negotiates a distinguished node status with at least a subset of other nodes 240-246. In various embodiments, each cluster or subset of nodes negotiates (via respective negotiation modules) a distinguished node status for that cluster or subset based on one or more factors. The distinguished node status may be negotiated based on physical location of a node relative to other nodes or relative to a signal source. Alternatively, the distinguished node status could be negotiated as the node (e.g., sensor node) with the lowest SNR (signal-to-noise ratio) which might coincide with this node avoiding the collection of sensory data to save power.

Power monitor 220 provides power information for the wireless node to negotiation module 212. For example, node 210 may be a remote wireless node with finite battery power. Power monitor 220 may provide information related to the amount of remaining power available in the node's battery, the rate of use of power by node 210, and/or other power-related information. Such information could be used, for example, in an automatic negotiation that determines that the node with the largest amount of power available should be designated as the distinguished node. Having more power available may allow the node to be in a better position to perform data compression (which can be a power-intensive operation).

Yet another factor that could affect negotiation of distinguished node status is a distance (e.g. Euclidean distance, wireless channel attenuation, number of hops, etc.) of a node to a processing station (e.g. processing station 250). The node with the smallest distance to a processing station or other destination could be selected as the distinguished node to minimize the transmission power used to send compressed data (and/or other data) to the processing station.

Merely by way of example, assume that node 210 is selected as the distinguished node for wireless network 200 (or a cluster within network 200). Accordingly, estimation module 216 uses sensory data, including data received from other nodes, to generate an estimate of the sensory data to be compressed. Sensory data received from other nodes may be at least partially compressed in some embodiments.

As discussed above, sensory data from neighboring nodes may be correlated. For example, if nodes in network 200 are measuring seismic activity, it is foreseeable that seismic data from node 210 will be similar to seismic data collected at node 246, etc. In addition to spatial correlation of sensory data between nodes (e.g., neighboring nodes), there may also exist temporal correlation among sensory data—both from a single node and from a collection of nodes. Sample-shifting module 226 dimensionally shifts (e.g., in time, space, etc.) sensory data samples to align them for improved conditional compression or differential compression. For example, if sensory data samples collected at neighboring nodes are essentially time-shifted versions of each other, then time-shifting the samples into alignment can reduce the differences between samples when performing differential compression.

Sensor 222 collects sensory data for node 210. Sensor 222 could be any type of sensor to collect sensory data including, but not limited to, a temperature sensor, a seismic activity sensor, an accelerometer, a gyroscope, a chemical sensor, a pressure sensor, a light or infrared sensor, etc. Tagging module 224 tags collected sensory data with one or more types of metadata (i.e., data about data). For example, network node 210 may be equipped with a clock that is synchronized on network 200 or it may have access to a clock signal. Thus, tagging module may tag sensory data with a timestamp or other suitable timing information. Additionally, node 210 may have modules and/or components to determine or that have access to location information for node 210. For example, node 210 could be equipped with a GPS (Global Positioning System) receiver or it may have processing tools to triangulate or otherwise determine its position/location without the direct or even indirect use of GPS.

Estimation module 216 generates an estimate of the sensory data via statistical modeling. For example, if the sensory data were temperature data, then the estimate could be an average temperature value for all sensory data, sensory data over a certain time period, sensory data from a location or group of locations, etc. The estimate may be based on samples shifted by sample-shifting module 226. Conditioned on the estimate, data compressor 218 compresses sensory data. Where shifted samples are used, compressor 218 includes information about the shifts used to produce the estimate when compressing the sensory data. This allows the shifted samples to be reconstructed in their unshifted form during decoding.

In some embodiments, transmitter 214 explicitly sends the estimate (in compressed or uncompressed form) along with compressed sensory data to processing station 250. In such embodiments, processing station 250 uses the estimate to decompress the compressed sensory data.

In other embodiments, the compressed data includes sufficient information for processing station 250 to reconstruct the estimate and then decompress the sensory data based on the estimate. For example, if sensor 222 collects temperature data, then at time t=0, the estimate may represent an average temperature, Tavg(0), corresponding to the average of temperatures T(i,0) at time 0 for other nodes, with i being the node index or number, i=1, 2, . . . , n. Compressor 218 then differentially compresses collected temperature data by computing Tc(i,0)=T(i,0)−Tavg(0), where again i is the node number. Transmitter 214 then sends Tavg(0) and a compressed version of the differential data Tc(i,0) for i=1, 2, . . . , n to processing station 250. At time t=1, compressor 218 computes Tavg(1) (average of node temperatures T(i,1) at time 1) and Tc(i,1)=T(i,1)−Tavg(1). Transmitter 214 then sends a compressed version of the difference (Tavgc(1)=(Tavg(1)−Tavg(0)) and a compressed version of the difference Tc(i,1) for i=1, 2, . . . , n to processing station 250. Accordingly, even though Tavg(1) is not explicitly sent to processing station 250, it can be reconstructed from the information already received and decompressed, namely Tavg(0) and Tavgc(1), according to Tavg(1)=Tavg(0)+Tavgc(1). Alternatively, Tavg(1) could be differentially compressed by compressor 218 with respect to some other function of the time 0 node temperatures T(i,0)'s, and not necessarily the average of these temperatures. Let f denote such a function. Using this notation, 218 would compute Tagvc(1)=Tavg(1)−f(T(1,0),T(2,0), . . . ,T(n,0)) and transmitter 214 would send a compressed version of Tavgc(1) determined in this manner to processing station 250. Processing station 250 could then reconstruct Tavg(1) by decompressing Tavgc(1), computing f(T(1,0), T(2,0), . . . ,T(n,0)) using the previously decoded and available temperatures T(1,0),T(2,0), . . . ,T(n,0), and determining Tavg(1) as Tavg(1)=Tavgc(1)+f(T(1,0), T(2,0), . . . ,T(n,0)).

The various network node modules and components (negotiation, estimation, power monitor, etc.) of FIG. 1 and FIG. 2 may be implemented as one or more software modules, hardware modules, special-purpose hardware (e.g., application specific hardware, application specific integrated circuits (ASICs), embedded controllers, hardwired circuitry, etc.), or some combination of these. Additionally, various functions and operations of described embodiments may be implemented as instructions executable by a processor (e.g., processor 228) and stored on a computer-readable storage medium (e.g., memory 230).

Figure 3:
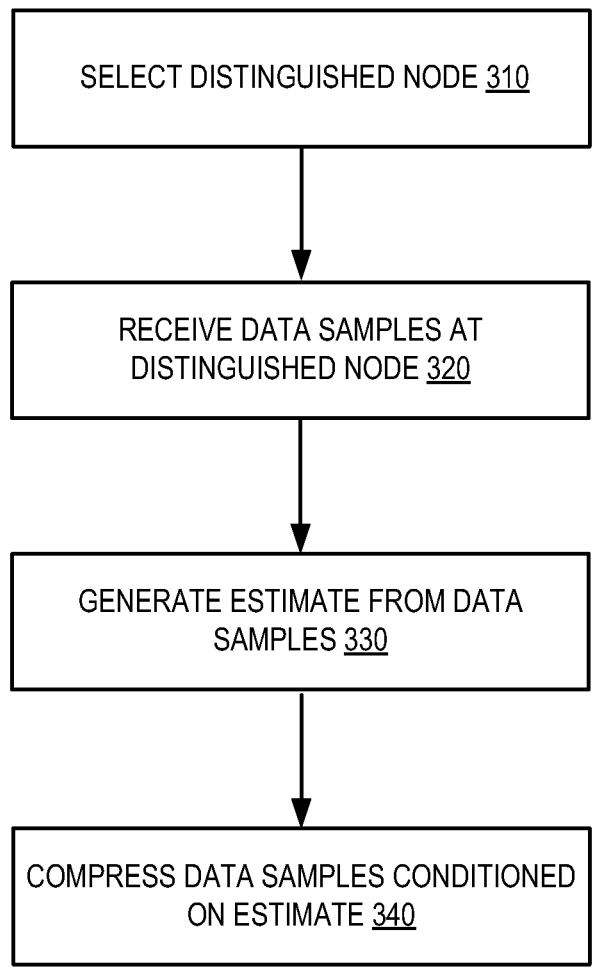
FIG. 3 is a flow diagram of operation in a system according to various embodiments.

FIG. 3 illustrates a flow diagram of operation in a system according to various embodiments. FIG. 3 includes particular operations and execution order according to certain embodiments. However, in different embodiments, other operations, omitting one or more of the depicted operations, and/or proceeding in other orders of execution may also be used according to teachings described herein.

A distinguished node is selected 310 from a plurality of nodes in a wireless network. In various embodiments, the nodes in the wireless network are sensor nodes that collect sensory data. However, in certain embodiments, it is not necessary that all nodes or even some of the nodes be sensor nodes. As discussed above, the distinguished node may be selected based on a variety of factors including, but not limited to, node location (e.g., relative to other nodes, signal sources, etc.), node power (e.g., relative to other nodes) and the like. Once a distinguished node has been established, other nodes in the network, perhaps those belonging to a particular cluster of nodes, send data samples to the distinguished node. The distinguished node receives 320 the data samples and generates 330 an estimate from the data samples. For example, the data samples may be processed for statistical correlation and the estimate is generated therefrom.

Statistical dependence between data samples may then be leveraged to optimize data compression. Indeed, data samples received from neighboring nodes (e.g., all nodes in the cluster of the distinguished node) are compressed 340 conditioned on the estimate. In various embodiments, data samples may be differentially compressed. While various types of compression (e.g., lossy or lossless) could be used in embodiments described herein, lossy compression may provide more power conservation and better compression ratios than other modes of compression.

Not only does compressing the data samples conserve power, but in view of wireless bandwidth limitations, a greater degree of compression minimizes the amount of data transmitted on a wireless channel. Thus, compressing data in view of multiple dimensional shifts (e.g., shifting data samples in space, time, etc.) may further conserve power and wireless bandwidth. As used herein, dimensional-shifting refers to shifting sensory data samples in view of one or more dimensions. For example, data samples from different nodes may be shifted in time (i.e., a temporal dimension) to leverage temporal dependencies between samples during compression (e.g., differential compression). Similarly, data samples may be shifted in space (i.e., a spatial dimension) to leverage spatial dependencies between samples during compression. One specific example of compressing data in view of sample-shifting in multiple dimensions is the MPEG (Moving Picture Experts Group) video coding standard.

Figure 4:
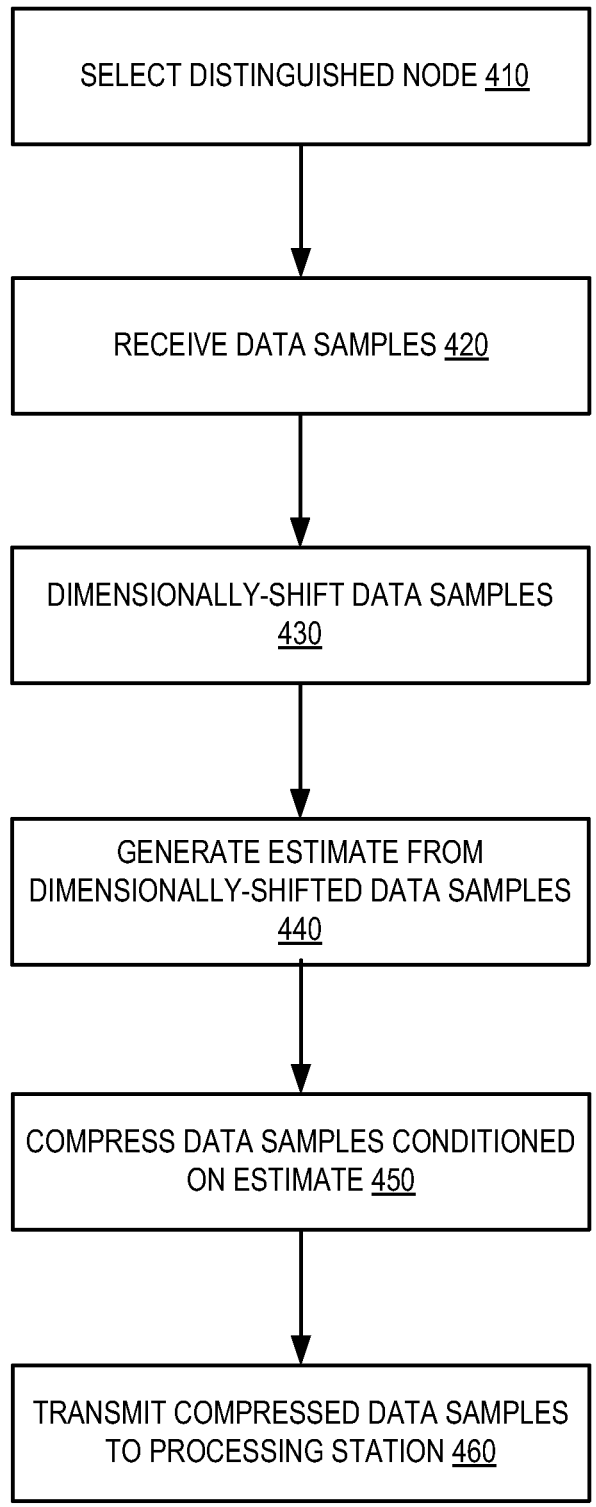
FIG. 4 is a flow diagram of operation in a system according to various embodiments.

FIG. 4 illustrates a flow diagram of operation in a system according to various embodiments. FIG. 4 includes particular operations and execution order according to certain embodiments. However, in different embodiments, other operations, omitting one or more of the depicted operations, and/or proceeding in other orders of execution may also be used according to teachings described herein.

In a wireless network of nodes, a node is selected 410 as a distinguished node. The distinguished node may represent a cluster of nodes or the entire network of nodes. In embodiments where a distinguished node represents a cluster of nodes, more than one distinguished node may be selected within the wireless network. A distinguished node may be selected in view of a variety of factors described herein (e.g., node location, node power, etc.). The selection of a distinguished node for a cluster of nodes may involve nodes in the cluster exchanging messages (e.g., control messages). For example, if available power is the criteria for becoming a distinguished node, each node in the cluster may send a message to the other nodes indicating how much power the node has available. One node may collect the messages and determine which node has the most power and notify the other nodes. Or, each node could collect the messages and compare its own power level with power levels from other nodes. In such case, a node could tag itself as the distinguished node if its power level is higher than all other nodes. If a different node has a higher power level, the node can tag itself as a non-distinguished node or do nothing. Other selection processes and/or methods among the nodes could be used to determine/select the distinguished node in different embodiments. If the distinguished node status is self-designated, the distinguished node may notify the other nodes that it has claimed the role of distinguished node.

The node selected as the distinguished node receives 420 data samples from other nodes (either directly or indirectly). For example, the distinguished node might receive data samples from its immediate neighbors. In various embodiments, received data samples are dimensionally shifted 430 to take advantage of any correlation in the data. For example, if the nodes collect seismic wave data over time, seismic waves arrive at different sensors with different delays. In other words, seismic waves arriving at neighboring sensors are likely time-shifted versions of one another. Thus, by time-shifting seismic wave samples to bring them into alignment with each other, the correlation (i.e., similarities) in the samples can be better leveraged for compression. For example, time-aligned samples can be used as a basis for computing the estimated data for differential compression of the received data samples. Differential compression can be applied using time aligned estimated data as well as time-aligned received sensory data. The compressed data should include a description of the parameters of any time-aligning that may have to be reversed to reconstruct the unshifted sensory data. Other types of dimensional shifting can be similarly used (e.g., spatial-shifting, etc.) to improve data compression.

In view of the shifted data samples (although it is not necessary that data samples be shifted), an estimate is generated 440. The estimate could be an average value of the set (or a subset) of shifted data samples or other suitable representation of the set (or subset) of shifted data samples. Generating the estimate, in various embodiments, may also involve computing the statistical correlation in the data samples. Conditioned on the estimate, data samples are compressed 450 by the distinguished node. The compression can be lossy or lossless; however, lossy compression may conserve power at the distinguished node and save network bandwidth while providing sufficiently accurate values upon decompression.

In other embodiments, generating the estimate involves generating a statistical model (e.g., conditional probability distributions for data samples conditioned on the estimate generated and/or previously processed data samples and/or on further estimates derived thereof). Compression 450 may then be based on the statistical model, for example, by assigning shorter codes to conditionally likelier sample values.

More particularly, statistical dependencies may be modeled between sensor data samples from one particular node (e.g., at different times) or between sensor data samples and the estimate (e.g., at the same time). In various embodiments, to compress a sample i collected by a first sensor node, the statistical model may include dependencies with respect to the i–1 and i–2 samples of the first node (temporal dependencies). The statistical model might also include (or alternatively include) dependency with respect to sample i of the estimated data (spatial dependencies). The statistical model may consist of a conditional probability distribution $P(X_i|X_{i-1}, X_{i-2}, Y_j)$, where $X_j$ denotes the sample j collected by the first sensor node, and $Y_i$ denotes the sample i of the estimated data. Other models could exploit other dependencies, either in the same sensor or across sensors or with respect to the estimate.

A data compressor (e.g., data compressor 218 of FIG. 2) encodes the data sequence $X_i$ based on the statistical model using an entropy coder matched to the conditional probability distribution $P(X_i|X_{i-1}, X_{i-2}, Y_i)$. In various embodiments, the entropy coder might implement a Huffman code or an arithmetic code. In another embodiment, an estimate $X_i'$ of $X_i$ may be generated as a function of $X_{i-1}$, $X_{i-2}$, and $Y_i$ and a probability distribution $P'(X_i-X_i')$, and an entropy coder of a compressor (e.g., compressor 218) may be matched to this probability distribution. In yet another embodiment, a data compressor may code the difference $X_i-X_i'$ with a Golomb code.

Compressed data samples are transmitted 460 to a processing station. The transmission of compressed samples may include sufficient information to reproduce the estimate derived by the distinguished node. The processing station may not have the same or similar power restrictions as the distinguished node and other nodes in the network. Regardless, the processing station decodes the compressed data samples. The decoded/decompressed data samples can then be compiled and/or used in various useful ways. For example, the data samples can be used to generate a map of a geographic area that illustrates data from the samples (e.g., a temperature map, a seismic vibrations map, etc.).

The invention claimed is:

1. A wireless node, comprising:
  a negotiation module to dynamically negotiate a distinguished node status with other nodes in a wireless network to designate a particular distinguished node among the nodes in the network;
  a receiver to receive sensol3, data from other nodes in the wireless network when the wireless node is the particular node in the network having the distinguished node status;
  an estimation module to generate at least one estimate from the sensory data received from the other nodes in the network by exploiting correlation in the sensory data from different nodes that arises from statistical dependency between various samples of data in the sensor, data;
  a data compressor to compress sensory data using the estimate as an input to a compression process; and
  a transmitter to send compressed sensory data to a processing station;
  wherein the dynamic negotiation of the distinguished node status is based on power available in at least some of the nodes in the wireless network.

2. The wireless node of claim 1, further comprising:
  a power monitor to provide power information for the wireless node to the negotiation module.

3. The wireless node of claim 1, further comprising:
  a sensor to collect sensory data; and
  a tagging module to tag sensory data.

4. The wireless node of claim 3, the tagging module to tag sensory data with one or more of:
  a timestamp; and
  a location tag.

5. A non-transitory computer-readable storage medium containing instructions that, when executed, cause a computer to:
  dynamically negotiate a distinguished node status with other nodes in a wireless network to designate a particular node among the nodes in the network as having the distinguished node status;
  collect, in the particular node having the distinguished node status, sensory data from the other nodes in the network;
  generate at least one estimate based at least in part on the sensory data received from other nodes in the wireless network; and
  compress sensory data conditioned on the estimate, such that the estimate is used as an input to a compression process compressing the sensory data;
  wherein the dynamic negotiation of the distinguished node status is based on power available in at least some of the nodes in the wireless network.

6. The computer-readable storage medium of claim 5, wherein the instructions that cause the compression of sensory data comprise further instructions that cause the computer to:
 compress sensory data according to at least one of spatial correlation of sensory data collected at different nodes, and time correlation of sensory data.

7. The computer-readable storage medium of claim 5, wherein the dynamic negotiation of the distinguished node status is based on physical location of a node relative to one or more of:
 other nodes in the wireless network;
 a signal source for sensory data; and
 a processing station.

8. The computer-readable storage medium of claim 5, wherein the instructions that cause the generation of the estimate comprise further instructions that cause the computer to:
 generate an average of the sensory data.

9. The computer-readable medium of claim 5, wherein the instructions that cause the generation of the estimate include further instructions that cause the computer to:
 determine conditional probability distributions of the sensory data received from other nodes in the wireless network conditioned on the estimate.

* * * * *